(12) United States Patent
Rönkä et al.

(10) Patent No.: US 8,847,925 B2
(45) Date of Patent: *Sep. 30, 2014

(54) USER INPUT ARRANGEMENT AND RELATED METHOD OF MANUFACTURE

(75) Inventors: Kari Rönkä, Oulu (FI); Antti Keränen, Oulu (FI); Janne Aikio, Oulu (FI)

(73) Assignee: Teknologian Tutkimuskeskus VTT, VTT (FI)

( * ) Notice: Subject to any disclaimer, the term of this patent is extended or adjusted under 35 U.S.C. 154(b) by 149 days.

This patent is subject to a terminal disclaimer.

(21) Appl. No.: 13/265,875

(22) PCT Filed: Apr. 26, 2010

(86) PCT No.: PCT/FI2010/050339
§ 371 (c)(1),
(2), (4) Date: Oct. 23, 2011

(87) PCT Pub. No.: WO2010/122233
PCT Pub. Date: Oct. 28, 2010

(65) Prior Publication Data
US 2012/0038593 A1    Feb. 16, 2012

(30) Foreign Application Priority Data
Apr. 24, 2009 (FI) .................................. 20095458

(51) Int. Cl.
| | | |
|---|---|---|
| G09G 5/00 | (2006.01) |
| G06F 3/041 | (2006.01) |
| G06F 3/042 | (2006.01) |
| G06K 11/06 | (2006.01) |
| G08C 21/00 | (2006.01) |
| F21V 8/00 | (2006.01) |
| G02B 6/35 | (2006.01) |

(52) U.S. Cl.
CPC ............ *G02B 6/0021* (2013.01); *G02B 6/3596* (2013.01); *G02B 6/0065* (2013.01); *G02B 6/3522* (2013.01); *G06F 3/0421* (2013.01); *G06F 2203/04109* (2013.01)
USPC ........... 345/176; 345/156; 345/173; 345/175; 178/18.01; 178/18.09; 178/18.11

(58) Field of Classification Search
USPC ............... 345/156, 173, 175, 176; 178/18.01, 178/18.09, 18.11
See application file for complete search history.

(56) References Cited

U.S. PATENT DOCUMENTS 6,972,753 B1    12/2005 Kimura
7,432,893 B2    10/2008 Ma
(Continued)

FOREIGN PATENT DOCUMENTS

EP    1288848    3/2003
FI    20086009   4/2010
(Continued)

*Primary Examiner* — Ilana Spar
(74) *Attorney, Agent, or Firm* — Mark M. Friedman (57) ABSTRACT

Arrangement (202) for a user input device, such as a touchscreen or a touchpad, comprising a substrate (206), such as an optically substantially transparent flex film or a multilayer film, said substrate comprising support electronics (212) for providing power, control and/or communications connection to further electronic components (210), a number of emitters and detectors (210) arranged to said substrate into contact with the support electronics, for emitting and detecting light, respectively, and a lightguide (208) provided, such as laminated, onto the substrate such that said emitters and detectors are optically coupled to the lightguide material, the properties of the lightguide including the refractive index of the lightguide material being selected and the emitters and detectors being configured so as to enable, when in use, total internal reflection (TIR) -type propagation of light within the lightguide between the emitters and detectors, and recognition of a touch on the basis of a drop in the TIR performance as determined from the detected light. A related method of manufacture is presented.

9 Claims, 5 Drawing Sheets

(56) References Cited

U.S. PATENT DOCUMENTS

| | | |
|---|---|---|
| 7,465,914 B2 | 12/2008 | Eliasson et al. |
| 8,031,186 B2 | 10/2011 | Ostergaard |
| 2002/0033805 A1* | 3/2002 | Fujioka et al. ............... 345/175 |
| 2006/0114237 A1* | 6/2006 | Crockett et al. ............. 345/173 |
| 2008/0007541 A1* | 1/2008 | Eliasson et al. ............. 345/176 |
| 2008/0088603 A1 | 4/2008 | Eliasson et al. |
| 2009/0085894 A1* | 4/2009 | Gandhi et al. ............... 345/175 |
| 2009/0185775 A1* | 7/2009 | Hodono ........................ 385/14 |
| 2011/0216042 A1* | 9/2011 | Wassvik et al. ............... 345/175 |

FOREIGN PATENT DOCUMENTS

| | | |
|---|---|---|
| GB | 2409515 | 6/2005 |
| WO | WO2008004097 | 1/2008 |
| WO | WO2008004101 | 1/2008 |
| WO | WO2008004103 | 1/2008 |

* cited by examiner

PRIOR ART

Figure 1a

PRIOR ART

USER INPUT ARRANGEMENT AND RELATED METHOD OF MANUFACTURE

FIELD OF THE INVENTION

Generally the present invention relates to optics and electronics. Particularly, however not exclusively, the invention pertains to UIs (user interface) comprising a touch input arrangement, such as a touchscreen arrangement, utilizing the total internal reflection (TIR) phenomenon.

BACKGROUND

Touchscreens may apply of a number of varying technologies for obtaining the touch-sensitive functionality. Among various other potential options e.g. capacitive, resistive, infrared, optical imaging (camera-based), acoustic, and hybrid solutions are feasible.

Quite a few of the current infrared solutions implement an unrestricted optical connection between light sources and receivers, whereupon a finger or stylus deforming the screen cover, which overlays the display and light beams of the detection arrangement, then interrupts one or some of the beams for location detection purposes, or alternatively, the finger or stylus may directly interrupt the beam(s) in versions having no transparent overlay plate. Touch detection capability of an infrared solution may also rely on FTIR (frustrated total internal reflection) phenomenon, wherein the amount and distribution of light reaching the detectors is dependent on the disturbance introduced to a lightguide surface by e.g. a fingertip or a stylus applied for control input purposes so that a phenomenon called 'Frustrated Total Internal Reflection' (FTIR), i.e. light (energy) leakage, takes place.

Figure 1A:
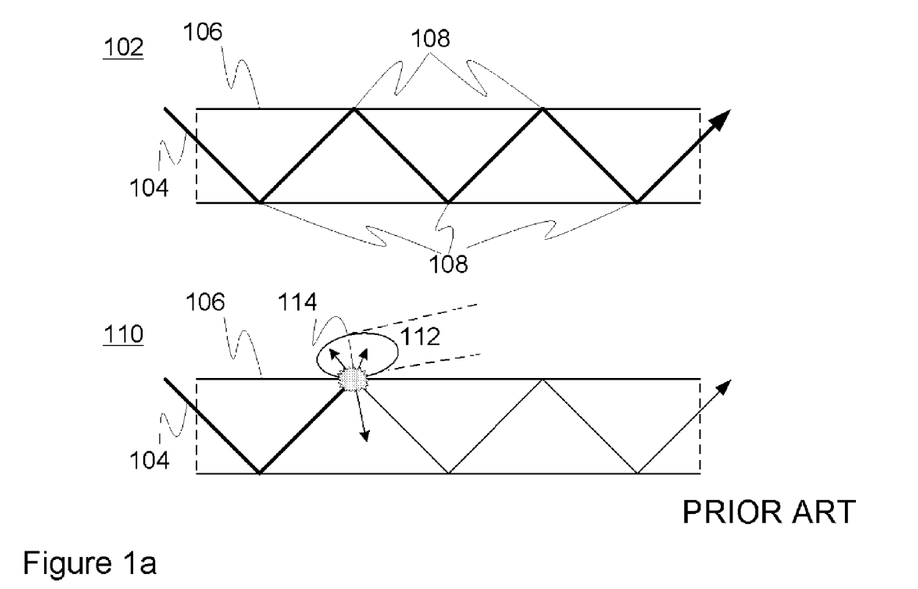
FIG. 1 illustrates the total internal reflection phenomenon and utilization thereof in touchscreens.

FIG. 1a illustrates the FTIR phenomenon in connection with a lightguide. In the scenario of sketch 102, a ray of light 104 is incoupled to the lightguide 106 at one end in such a way that it propagates inside the lightguide by totally reflecting 108 from the walls thereof. The ray 104 finally exits the lightguide 106 via the far-end thereof. In the subsequent scenario of sketch 110 a fingertip 112 is placed on the lightguide top surface so that at least part of light is absorbed (in the finger), diffusively reflected, and/or refracted 114 at the particular location of contact in different directions, e.g. outside the lightguide 106, and possibly only a portion of the original ray is specularly reflected and ultimately reaches the far-end as earlier. Note that the ray 104 is represented thinner in the figure after the interaction point 114 in the original direction of propagation, which is used to depict the aforesaid effect of energy loss (the star and small arrows in the figure) due to the FTIR taking place. FTIR-based light leakage/loss may be then detected and utilized in position sensing applications such as touchscreens that generally exploit the TIR effect of light.

Some theoretical aspects behind the (F)TIR phenomenon are next briefly derived from the well-known Snell's law. Considering the standard representation thereof, i.e. $n_1 \sin \theta_1 = n_2 \sin \theta_2$, wherein n's represent the indexes of refraction on the both sides of a medium border whereby θ's represent the incident angles relative to the normal of the medium border, respectively, and then setting $\theta_2$, which thus refers to the refracted ray, as 90°, we obtain a so-called 'critical angle' for the incident angle $\theta_1$ via the modified equation of Snell's: $n_1 \sin \theta_1 = n_2$. Typically, when light enters a boundary region between two media, portion thereof is refracted and portion is reflected. However, for the angles of incidence larger than the critical angle, the light will be substantially completely reflected at the medium border, wherein the angle of incidence is equal to the angle of reflection according to the law of reflection. A general prerequisite for the total internal reflection to occur is the propagation direction of light from the medium with a higher index of refraction (optically denser material) into the medium with a lower (~less dense material) index, i.e. $n_1 > n_2$.

For instance, in the example of FIG. 1a placing a finger on the lightguide may change the refractive index of the neighbouring medium radically (assuming the original neighbouring medium 2 is e.g. air with refractive index of about 1 meanwhile the index of a human skin may be about 1.4-1.5, for instance) potentially causing the considerable coupling loss between the lightguide incoupling and outcoupling ends due to the increase in the critical angle and possibly even the requisite for total internal reflection $n_1 > n_2$ not holding true anymore, whereupon many rays falling between the range of old and new critical angles may now actually refract instead of reflection. In practice, e.g. the surface roughness of the lightguide affects the fact that the sealing between it and the finger, which has surface irregularities as well, is not perfect, i.e. some air still remains in between. However, thanks to a so-called evanescent wave coupling, wherein evanescent waves extending from the lightguide across the lightguide-external medium border (e.g. glass-air interface) to a further nearby (order of light wavelength) medium, such as the human finger, having a higher refractive index compared to the sandwiched medium, such as air, and pass energy thereto as well like in quantum tunneling, a perfect seal is not even required for coupling purposes. Thus, the total internal reflection is said to be 'frustrated'.

Publication US20060114237 discloses an FTIR touch screen provided with infrared emitters/receivers. The concept of the solution of publication is visualized in FIG. 1b as an isometric sketch. The disclosed arrangement utilizes a strobing-type scan, wherein a plurality of light emitters 120, 122 and receivers 118, 124 have been organized along the edges of the lightguide 106 and they are sequentially activated/deactivated in emitter-receiver pairs (~note the broken lines illustrating the main direction of light propagation between an emitter and receiver of a single pair) so that a touch at a certain location on the lightguide can be detected by the reduced amount of light at the receiver of an active emitter-receiver pair due to the FTIR phenomenon.

Without any intention to deny the advantages and benefits offered by currently available touchscreen or corresponding solutions in providing more sophisticated UI means over more conventional options such as keyboards and mouses, certain problems still exist therewith naturally depending on each particular use case. For example, traditional touchscreens are often somewhat pricey to implement and manufacture, and they also take a considerable amount of space in the end product without forgetting the induced additional weight, which must be thus taken into account in the very beginning of the overall R&D project. The touchscreens may even consume suprising amount of extra power e.g. in the context of mobile devices. Further, additional structures such as light incoupling and/or outcoupling structures, e.g. prisms, reflectors, gratings, etc, may be required to funnel the light from the light source to the lightguide and/or from the lightguide to the receiver, respectively. Such structures require some more design work and may add to the end product weight, coupling losses, and price among other factors.

SUMMARY OF THE INVENTION

The objective of the embodiments of the present invention is to at least alleviate one or more of the aforesaid drawbacks evident in the prior art arrangements in the context of UI arrangements utilizing the TIR phenomenon including e.g. various FTIR-based touchscreen applications. The objective is generally achieved with an arrangement for obtaining user input, wherein a lightguide may be laminated, moulded or otherwise disposed onto a substrate having one or more layers and comprising electronics including different optoelectronic components.

Thereby, in accordance with one aspect of the present invention an arrangement for a user input device, such as a touchscreen or a touchpad, comprises:

a substrate, such as an optically substantially transparent flex film or a multilayer film, said substrate comprising support electronics, such as optionally roll-to-roll processed, printed electronics including a number of printed conductors, for providing power, control and/or communications connection to further electronic components, a number of emitters and detectors arranged to said substrate into contact with the support electronics, for emitting and detecting light such as infrared, visible or ultraviolet (UV) light, respectively, and a lightguide established, such as laminated, moulded or otherwise disposed, e.g. as a ready-made element such as a sheet, onto the substrate such that said emitters and detectors are optically coupled to the lightguide material, the properties of the lightguide including the refractive index of the lightguide material being selected and the emitters and detectors being configured so as to enable, when in use, total internal reflection (TIR)-type propagation of light within the lightguide between the emitters and detectors, and recognition of a touch on the basis of a drop in the TIR performance as determined from the detected light.

In one embodiment the lightguide, which may also act as a (plastic) screen cover, is established by laminating, moulding or otherwise disposing and securing it (by gluing, for example) onto the substrate, e.g. an electronics film, such that the emitters and/or detectors are optionally outside the lightguide but still enabled to emit light to propagate therein and receive light propagated through it, respectively, e.g. physically adjacent to the lightguide. Additionally or alternatively, one or more emitters and/or detectors, and optionally at least part of said support electronics, may be "immersed" in (positioned within) the lightguide material, i.e. at least part of the emitters and detectors may be located in one or more preferably pre-manufactured, such as carved, recesses, cavities, or holes of the lightguide surface facing the substrate.

In one embodiment at least part of the above arrangement is configured to act as an overlay for a display such that the display view can be seen by the user of the display by looking through the (part of the) arrangement, e.g. a touch area part or 'window' portion thereof, within a predetermined range of viewing angles. The arrangement may be thus positioned over a display for providing a touch interface. The arrangement may further be integrated with the display structure such that these two (touch area of the lightguide/underlying substrate portion and the display) are substantially in physical contact. Alternatively, they may physically separate, i.e. having e.g. air in between, as long as the functional connection is still provided.

Therefore, in a preferred embodiment, the substrate, such as a flex film, is optically substantially transparent so that a display or other light source/reflector may provide light through it towards the user. The required degree of transparency depends on the particular use case. In one embodiment the preferred transmittance in relation to predetermined wavelengths of light (e.g. infrared) may thus reside within the range of about 80 to 95%, for instance. In alternative embodiment the substrate is translucent so that is passes light diffusively. In a further alternative, the substrate might even be substantially opaque, whereupon the arrangement of the present invention is not suitable for passing light through but may be still be suitable and used as a control (touch) input means for various other purposes like touchpads of the portable, including hand-held, computers, for example. Yet in one embodiment, a portion of the substrate, such as the center portion, may be provided with an opening, which may substantially define a through hole, so that e.g. the display light can propagate through it and the lightguide material. Accordingly, the substrate may in this case be either transparent, translucent, or opaque, which applies also to scenarios wherein the arrangement is to be implemented as a display overlay. The substrate and/or the lightguide forming e.g. at least part of a (cover) surface of a desired touch-based control input device may be non-transparent to the user regarding visible wavelengths and then form a part of an element such as a dimmer switch, a lock, touch pad, or cell phone/PDA control(s) instead of a touchscreen, for example.

In one embodiment, a touchpad comprises the arrangement of the present invention. Optionally the touchpad comprises an element, such as a number of LEDs or other light sources, located so as to be capable of emitting visible light substantially through the lightguide (e.g. without total reflections) towards the user of the touchpad. For instance, the element may be located, in view of the touchpad user, under the lightguide, being thus located on the substrate or, provided that the substrate comprises a through-hole, on other carrier arranged such that the element may emit light via the through-hole of the substrate and through the lightguide towards the user. By controlling the light emission by the element (e.g. independent light sources such as LEDs thereof) and/or optional one or more intermediate elements of the optical path, such as a (black) foil with a desired design (e.g. shapes, patterns etc., which may be attained by perforation, for example), a number of icons or other symbols (graphics, letters, etc.) may be formed and displayed to the user. The icons or other symbols may thus be dynamic, e.g. activated/deactivated and/or changed dynamically by activation/deactivation of the associated light source(s) and optionally the intermediate elements. By pressing a corresponding location on the lightguide, the action associated with the displayed icon or other symbol, such as activation of e-mail software, may be triggered.

In the above or some other embodiments, at least portion of the support electronics, such as conductors, may include printed electronics. However, e.g. a flex substrate may alternatively or additionally be utilized in connection with the embodiments of the present invention with common (non-printed) electronics.

Likewise, in the above or some other embodiments at least portion of the remaining electronics, such as the emitters, detectors, and/or other components and elements, may be printed on the substrate by utilizing a selected printing technique, or attached as ready-made entities, e.g. SMT (surface-mount technology) and/or flip chip entities, to the substrate by e.g. glue or other adhesive.

In various embodiments of the present invention the touch action may refer to placing an actuation element such as a finger or a stylus substantially into connection with the lightguide, i.e. the lightguide, or the outmost additional material layer, if any, thereon. The connection may include, depending on each particular embodiment and e.g. the associated sensitivity of the detectors, a close-range connection via mere evanescent coupling, or a true physical contact, or a combination thereof, for example.

In the above or other embodiments, the arrangement may be calibrated such that in order to register the contact as an actual "touch" the users of the touchscreen arrangement according to the present invention have to physically contact the overlay surface, i.e. not just rely on evanescent coupling, either by a finger or a stylus so that the touch is deemed as recognized from a drop in TIR performance is clearly detectable in order to avoid annoying false detections etc.

The touch is typically initiated for control input purposes, such as triggering an action, at a target device that is at least functionally coupled to the touchscreen arrangement.

One or more properties, such as the refractive index, of the lightguide are preferably selected and/or designed to act co-operatively with a predetermined external medium, such as air, or a range of predetermined media optionally including air, to provide the TIR effect for the incoupled light. Instead of air, the adjacent external medium may include e.g. a material layer provided on one or more, e.g. top and bottom or all (when in use) side faces of the lightguide. The material layer may be arranged thin enough to enable evanescent coupling through it to the actuation element and thus touch detection via an FTIR effect, while the TIR effect may already take place at the lightguide-material layer interface. In another embodiment, one or more optical properties of the material layer and the lightguide, such as the refractive indexes, are selected about the same so that the light propagating within the lightguide under TIR condition does not substantially react to the interface and the TIR takes place at the material layer-further external medium (e.g. air) interface. The material layer may be configured to enhance the touch feel or improve/lower the actuation element's slide, e.g. by friction adjustment, on the lightguide's touch surface, for example. The material layer may alternatively or additionally act as a protective layer against physical or chemical impulses. There may be a plurality of (different) material layers on the surfaces of the lightguide as long as the TIR and FTIR effects can still be effectuated. In one embodiment the lightguide material is selected durable enough to act as a screen cover for the underlying display element.

The properties of the substrate (a thin film or a thicker substrate) may be selected such that the light behaves in a predetermined, desired manner at the lightguide-substrate interface. In one embodiment one or more optical properties of the substrate and the lightguide, such as the refractive indexes, are selected about the same so that the light propagating within the lightguide under TIR condition does not substantially react to the interface. In another embodiment, said one or more optical properties of the substrate and lightguide, e.g. the refractive index, are selected such that the TIR-propagating light is reflected, preferably as much as possible, from the lightguide-substrate interface. In any case, when the touchscreen overlay of the touch screen arrangement is disposed over a display, which is indeed a typical use scenario, the substrate shall be selected so as to remain optically transparent to the light, i.e. transparent to the (wavelengths of) visible light that is used to illuminate the displayed details to the user through the arrangement.

The detection levels for recognizing a sufficient drop in the TIR performance, which indicates a deliberate touch, may be determined by testing the response and/or change thereof at the detector a) when the emitter is constantly on and b) when a predetermined actuation element or range of elements, such as a fingertip (skin), is brought into contact, or at least within the range of evanescent coupling, with the lightguide. The detection threshold may be fixed or adaptive. In one embodiment the adaptive threshold analyzer determines the change in the detected intensity of light relative to an adaptive basic intensity level, instead of absolute values, for recognizing a touch. The basic level may be measured with a longer time window either constantly or in a timed manner, e.g. at intervals.

The emitters may include optoelectronic components such as LEDs (light emitting diode) or OLEDs (organic LED), for example.

The detectors may include optoelectronic components such as photodiodes or phototransistors, for example. In addition or alternatively, image sensors such as CCD (charge coupled device), MOS (metal-oxide semiconductor), or other types of sensors may be applied.

The lightguide material may include glass or plastics, for example. It may include e.g. PC (polycarbonate), PMMA (polymethyl methacrylate), PA (polyamide, nylon), COC (cyclo olefin copolymer), and/or COP (cyclo olefin polymer). A piece of aforesaid and/or other material, e.g. a sheet or film with desired dimensions, may be positioned and secured onto the substrate to establish the lightguide thereon. The piece may contain a number of recesses, cavities, or holes for accommodating at least part of elements such as emitters, detectors and/or support electronics disposed on the substrate.

Correspondingly, the substrate material may include e.g. PET (polyethylene terephthalate), PC, PEN (polyethylene naphthalate), PI (polyimide), LCP (liquid crystal polymer), PE (polyethylene), and/or PP (polypropylene).

The number of emitters and detectors may be, but does not have to be, equal. In one embodiment the emitters and detectors are organized in pairs, whereupon one pair may, in one activation option, be arranged to be active at a time. In a minimum case, there is a single emitter and detector arranged on the substrate.

In another aspect of the present invention, a method for manufacturing an arrangement for a user input device, such as a touchscreen or a touchpad, comprises:

providing a substrate, such as an optically substantially transparent film, arranging support electronics, such as printed electronics including a number of printed conductors, on the substrate for providing power, control and/or communications connection to further electronic components, arranging a number of emitters and detectors on said substrate into contact with the support electronics, for emitting and detecting light, respectively, and providing, such as laminating, moulding or otherwise disposing, e.g. as a ready-made element such as a sheet, a lightguide onto the substrate such that said emitters and detectors are optically coupled to the lightguide material, the properties of the lightguide including the refractive index of the lightguide material being selected and the emitters and detectors being configured so as to enable, when in use, total internal reflection (TIR)-type propagation of light within the lightguide between the emitters and detectors and recognition of a touch on the basis of a drop in the TIR performance as determined from the detected light.

In one embodiment the electrical wiring, such as conductors, is printed or otherwise formed on a flex film substrate or other type of flex or rigid substrate after which the optoelectrical components such as the emitters and detectors are attached to the film or other type of substrate, or the electrical components, such as the support electronics, emitters, and/or detectors, may be laminated into a multi-layer film structure, and finally the lightguide (plastic) is laminated or otherwise arranged onto the film or film structure substrate. Alternatively, all or most of the laminate layers may be laminated together at once. The lightguide may act as a screen cover.

Instead of lamination, the touch screen arrangement of the present invention could be obtained by other techniques including moulding such as injection moulding, wherein the substrate, e.g. the flex film, provided with electronics thereon, said electronics including the support electronics and further electronic components like the optoelectronic emitters and detectors, is used as an insert in the injection moulding process during which the lightguide material is over-moulded onto the electronics and the related substrate surface. Advantageously one or more coupling entities, such as connectors or contacts, which may have been already provided on the substrate to connect the arrangement to external elements, such as a main board of the host device, are not completely over-moulded, or are at least cleared afterwards.

As alluded hereinbefore, the utility of the different aspects of the present invention arises from a plurality of issues depending on each particular embodiment. The manufacturing costs for producing the touch screen arrangement in accordance with the present invention may be kept low due to rather extensive use of affordable and easily obtainable materials, components, and process technology. The feasible process technology also enables rapid industrial scale manufacturing of the arrangement in addition to mere prototyping scenarios. The arrangement may be kept thin, light, and energy conserving in order to suit most use scenarios with little modifications to the surrounding elements and designs. The coupling losses between the emitters, lightguide, and the detectors may be minimized as external, typically lossy, light funneling means such as gratings etc. are not necessary. The touch detection capability of the various embodiments of the arrangement is good with low sensitivity to e.g. dirt on the touch surface, and even multi-touch applications may be constructed. The arrangement may be easily combined with an existing display or device layout, and conveniently connected to an external target entity such as a host device mainboard via a flex cable, for example, which also enables easy replacement thereof in the future. The arrangement may further be made robust towards external impacts, depending on the used materials, in which case the arrangement also function as an optionally replaceable screen cover for the underlying display element. Yet, the arrangement suits particularly well various industrial applications including e.g. industrial automation/electronics control apparatuses, as it may provide hermetical (~splash-proof) isolation from the hostile use environment like humid and/or dusty air.

The expression "a number of" may herein refer to any positive integer starting from one (1). The expression "a plurality of" may refer to any positive integer starting from two (2), respectively.

In one embodiment described in more detail hereinafter, a touch screen arrangement following the basic principles set forth hereinbefore is provided with various alternative features disclosed as well.

Different embodiments of the present invention are also disclosed in the attached dependent claims.

BRIEF DESCRIPTION OF THE RELATED DRAWINGS

Next, the embodiments of the present invention are more closely reviewed with reference to the attached drawings, wherein

FIG. 2b illustrates an exemplary cross-section along the line A-A of the embodiment type shown in FIG. 2a.

DETAILED DESCRIPTION OF THE EMBODIMENTS

Figure 1B:
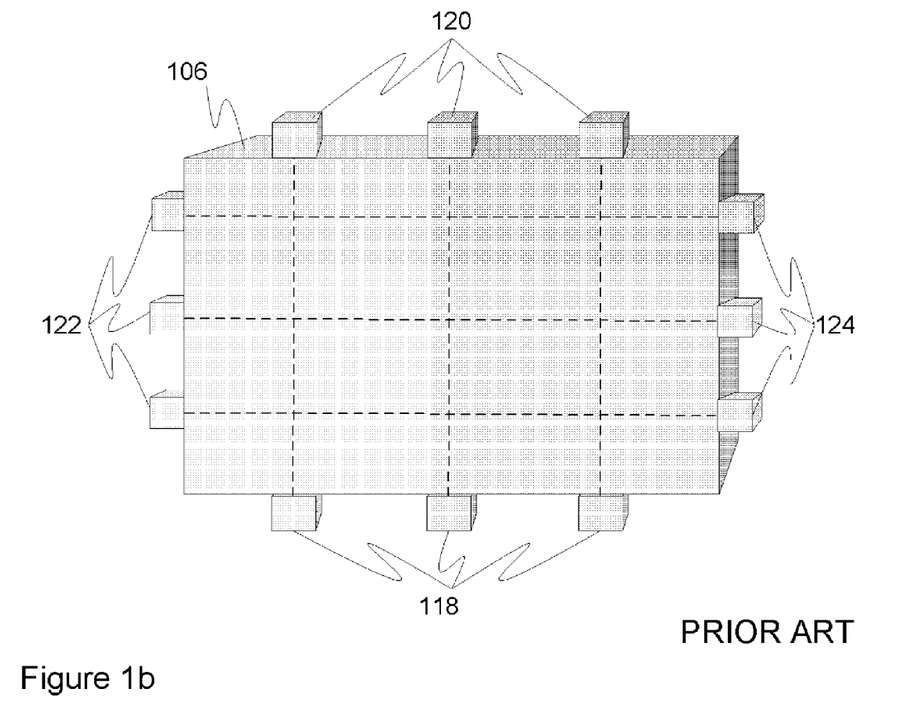
FIG. 1b illustrates one prior art touchscreen arrangement with multiple emitters and detectors disposed along the sides of a lightguide.

FIGS. 1a and 1b were already contemplated hereinbefore in connection with the review of the background of the invention.

Figure 2A:
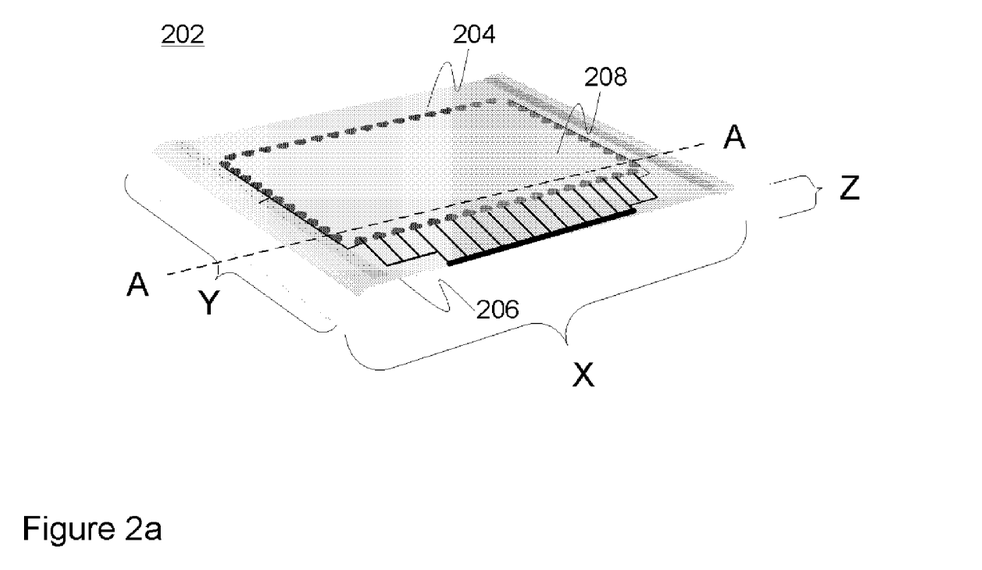
FIG. 2a illustrates one embodiment of the present invention.

Now referring to FIG. 2a, a perspective view 202 of one embodiment of the touchscreen arrangement is sketched. The touchscreen arrangement, which may be implemented as an overlay for a display, comprises a substrate such as a (flexible) film 206 accommodating electronics 204 such as support electronics like conductors and/or control circuitry, and also further electronic elements such as optoelectronic light emitter(s), detector(s), and optionally other components. The lightguide 208 has been provided thereon. It shall be noted that the principles set forth hereinafter may also be clearly applied to other type of touch-based control input devices, such as touch pads, by a skilled person.

For example, integration may be applied such that the lightguide material layer is laminated, moulded or otherwise disposed onto the electronics on the substrate, wherein the provided layer preferably comprises holes or other surface contours for accommodating at least part of the electronics such as optoelectronic components upon and after lamination or other desired lightguide-establishing process. Alternatively, at least part of the optoelectronic components could be left outside the (laminated) layer, being however located and configured (oriented, for example) so as to remain optically coupled with the layer. As a result despite of the particular embodiment, the layer acts as a lightguide between the emitters and the detectors and provides sealing/encapsulation to underlying elements as well.

The dimensions X, Y, Z of the arrangement may be selected so as to fit each particular manufacturing and use scenario (e.g. host device and display layout) as well as possible. For example, the substrate size could be about 150 mm (X)×150 (Y) mm ×125 μm (Z) wherefrom a smaller dedicated portion may be further determined for over-moulding, lamination and/or other processes, if desired. The thickness (Z) of the substrate may naturally vary depending on the embodiment and reside e.g. within the range of about 50 to 500 μm, for example. The thickness of the lightguide 208 may also vary use case—specifically and be about 1 mm-10 mm, for example. <=1 mm thickness may be desirable in applications wherein detection sensitivity and response is preferred over stiffness. On the contrary, thicknesses over 5 mm may fit particularly well scenarios wherein stiffness and associated additional durability is required. The intermediate thicknesses 1.5-2 mm may also suit many applications, e.g. mobile terminals and PDAs.

The shape of the arrangement and its constituents, e.g. the lightguide 208 and substrate 206, may be defined on the basis of the used manufacturing method and desired target shape(s). The illustrated, however merely exemplary, arrangement has substantially a rectangular (cuboid) shape, which works particularly well e.g. with roll-to-roll manufacturing methods and with typical display applications, but also e.g. round(ed) shapes are possible and achievable via proper cutting, for instance. Still in the illustrated example, the edges parallel to the Y-axis have been slightly bent downwards, in use position, to better fit the target apparatus, which could be a mobile terminal, a PDA (personal digital assistant), a music player, a multimedia player, or an industrial electronics and/or automation device, for example.

Figure 2B:
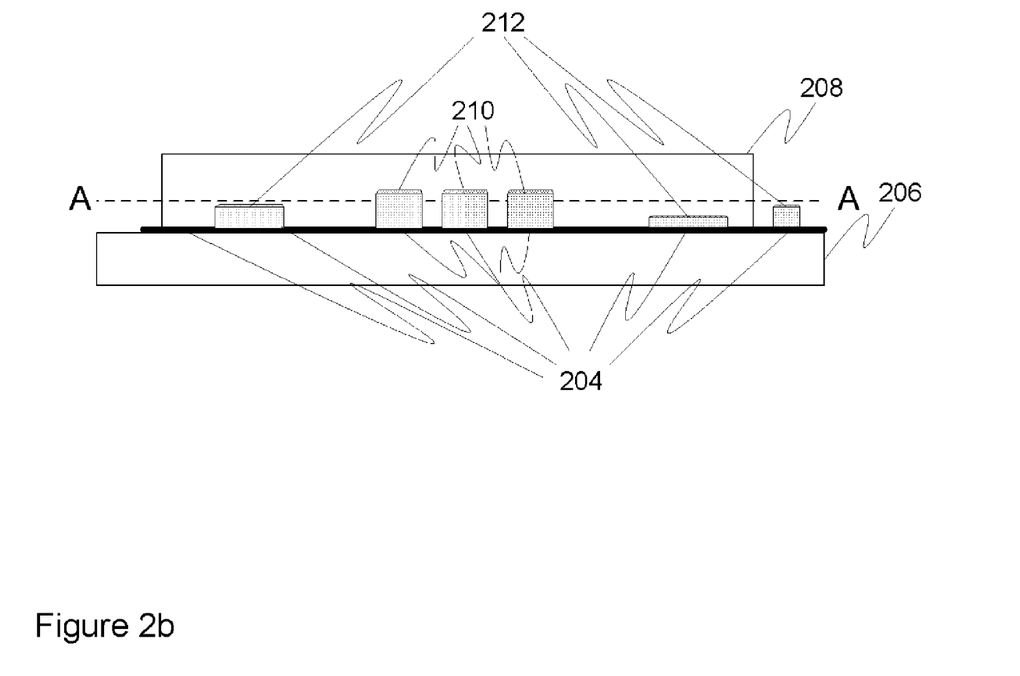

FIG. 2b discloses an exemplary cross-section along the line A-A of the embodiment type shown in FIG. 2a. In this example the lightguide 208 covers most of the substrate 206 surface onto which the electronics 204 including the emitters/detectors 210 and support electronics 212 have been provided. The emitters/detectors 210 may be located in the recesses or holes of the lightguide 208 formed in the surface portion facing the substrate. However, the electronics 204 do not have to reside encapsulated by the lightguide 208. This fact is visualized by a single electronic component 204 and a conductor portion on the right from the lightguide 208, wherein the conductor is illustrated by a thicker horizontal line extending along the border line between the substrate 206 and the lightguide 208. The electronics 204 may comprise elements of different dimensions as illustrated in the figure by varying height and width of the cross-sections.

In one embodiment the emitters and detectors 210 are located near the border of the lightguide 208, being preferably positioned such that the light is propagated substantially through the whole length of the lightguide in a predetermined direction after output by an emitter and prior to being captured by a detector. For instance, two rows of emitters may be located parallel and close to the two neighbouring side faces of the lightguide, respectively, e.g. two neighbouring side faces being parallel to planes YZ and XZ in FIG. 1, and two rows of detectors be similarly located relative to the opposite neighbouring side faces so that the light emitted by a predetermined emitter is captured by one or more predetermined detectors near the opposite side face. In other embodiments, at least some of the emitters and/or detectors 210 may be positioned otherwise. For example, they 210 may be located radially such that the detector formation of one or more detectors has a certain first radius (distance) from a predetermined center point or line, whereas one or more emitters have another, second radius relative to the same reference. In the case of angular lightguide, the detectors/emitters 210 may also be located near the vertices (~corner points) thereof. In one embodiment of a desired touchscreen or other control input arrangement at least one emitter such as a LED or OLED may be positioned in a middle of a target structure and a number of, preferably a plurality of, detectors are disposed around the at least one emitter.

Figure 3A:
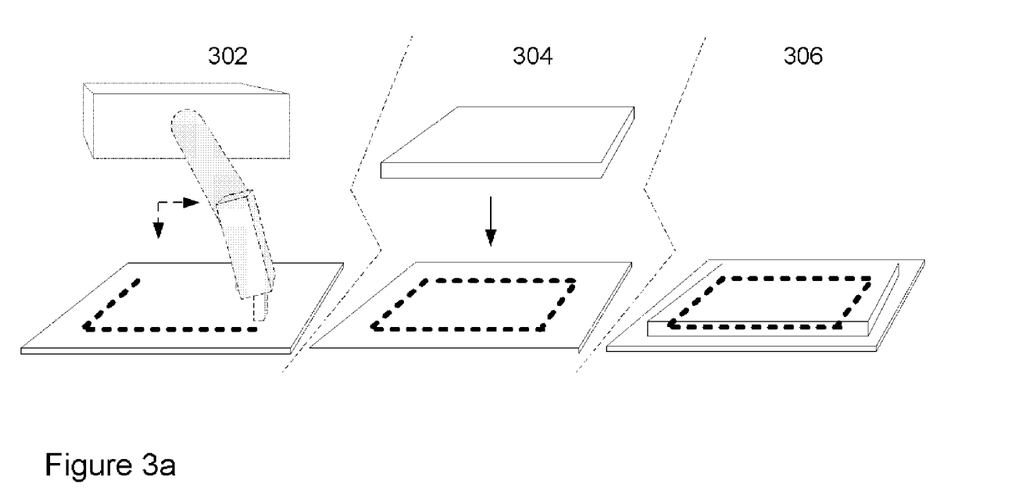
FIG. 3a generally illustrates one embodiment for manufacturing the touchscreen arrangement of the present invention.

FIG. 3a depicts, in a very general sense, one embodiment for manufacturing the touchscreen arrangement of the present invention. In phase 302 the substrate is provided with the necessary electronics such as conductors, detectors, emitters, and necessary control circuitry, which is illustrated by a rotating arm or nozzle working on the substrate surface. The arm could belong to a flip-chip bonding apparatus or inkjet printer, for example. In phase 304 the lightguide is arranged onto the substrate/electronics aggregate by lamination, for instance. At least part of the electronics are preferably "immersed" in the lightguide, for instance located in the recesses thereof, that thus encapsulates the aforementioned part, which may be seen in phase 306 representing one embodiment of the touchscreen arrangement capable of being used e.g. as a display overlay. The overlay may be ready-fitted to a host device (housing) or provided upon the display thereof and functionally coupled thereto only when needed.

Figure 3B:
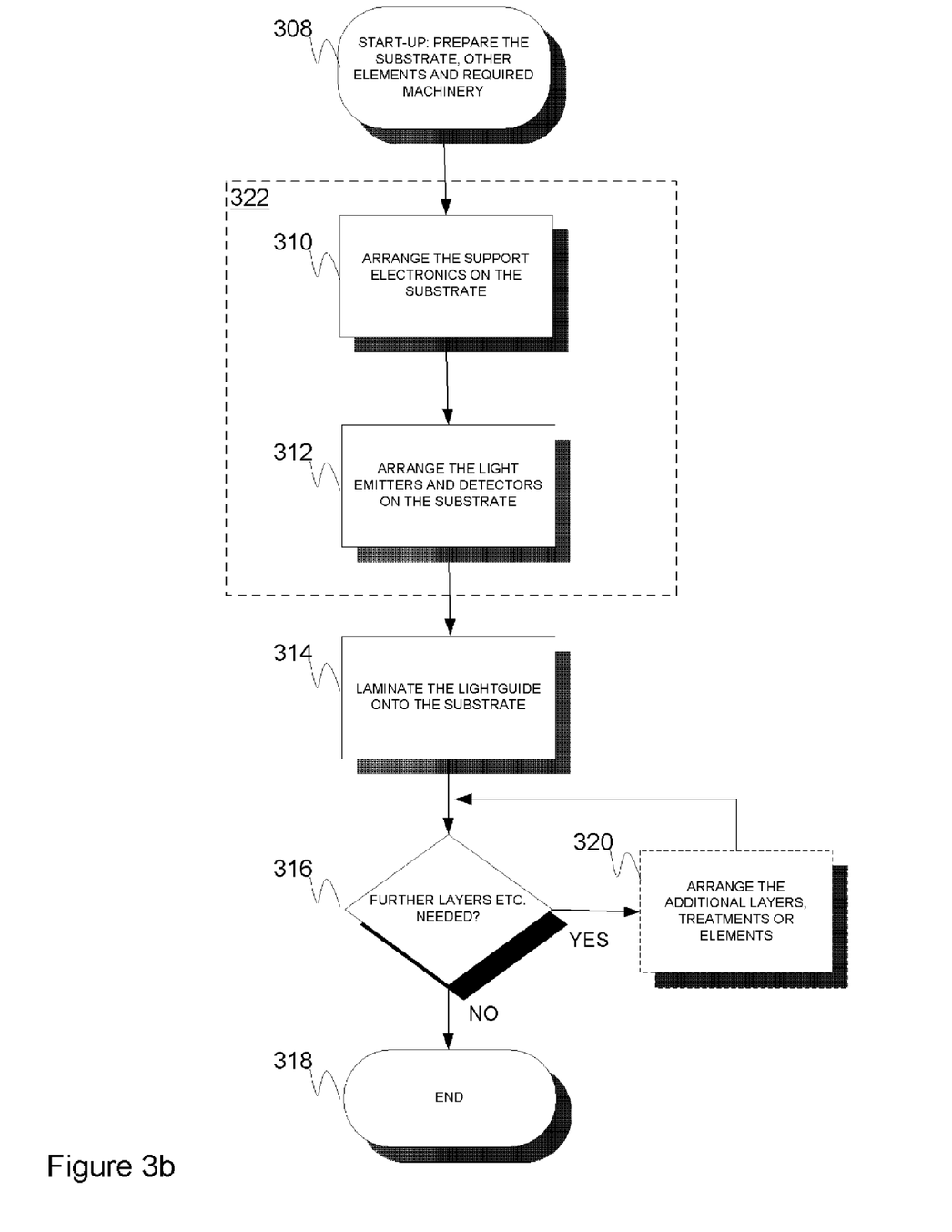
FIG. 3b is a flow diagram of an embodiment for manufacturing the touchscreen arrangement of the present invention.

FIG. 3b is a more detailed flow diagram of one embodiment for manufacturing the touchscreen arrangement of the present invention.

At 308, referring to a start-up phase, the necessary tasks such as material, component and device selection and acquisition take place. In determining the emitter and sensor types or e.g. other electronics and substrate/lightguide/conductor materials and shapes, specific care must be taken that the individual elements and material selections work together and survive the selected manufacturing process of the overall arrangement, which is naturally preferably checked up-front on the basis of the manufacturing process vs. component data sheets, or by analyzing the produced prototypes, for example.

The reference numeral 322 generally refers to manufacturing phases during which the initial substrate is provided with electronics comprising both the support electronics for driving the optoelectronic elements etc. and the actual optoelectronic elements. The resulting (aggregate) substrate may be a multilayer film comprising the aforesaid electronics and elements spread between different layers thereof. The internal phases 310 and 312 may be executed in a varying order that best fits the particular use scenario in question. Further, the internal tasks of shown phases may be reallocated between the phases 310, 312, if considered advantageous.

The used substrate may include, for example, polymers such as a PET or PC film. An applicable substrate shall be generally selected such that the desired flexibility, robustness, and other requirements like adhesion properties in view of the electronics and the lightguide material, or e.g. in view of available manufacturing techniques, are met.

The selected substrate may also be preconditioned prior to and/or during the illustrated processing phases. The substrate may be preconditioned to increase adhesion with other materials such as laminated, glued or injection-moulded lightguide plastics, for example.

In 310 the support electronics, such as electrical conductors and circuitry, may be printed or otherwise formed onto the substrate, on one or more (e.g. predetermined top and/or bottom, when in use) side faces. Feasible techniques for providing the electronics generally include screen printing, rotary screen printing, gravure printing, flexography, ink-jet printing, tampo printing, etching (like with PWB-substrates), transfer-laminating, thin-film deposition, etc.

For instance, in the context of conductive pastes, silver-based PTF (Polymer Thick Film) paste could be utilized for screen printing the circuit design on the substrate. Also e.g. copper or carbon-based PTF pastes may be used. Alternatively, copper/aluminum layers may be obtained by etching. In a further alternative, conductive LTCC (low temperature co-fired ceramic) or HTCC (high temperature co-fired ceramic) pastes may be sintered onto the substrate. One shall take into account the properties of the substrate when selecting the material for conductors. For example, sintering temperature of LTCC pastes may be about 850 to 900° C., which may require using ceramic substrates. Further, silver/gold-based nanoparticle inks could be used for producing the conductors.

Reverting to the feasible printing techniques, the paste/ink shall be selected in connection with the printing technique and the substrate material because different printing techniques require different rheological properties from the used ink/paste, for instance. Further, different printing technologies provide varying amounts of ink/paste per time unit, which often affects the achievable conductivity figures.

Electronic SMT components and circuits or (flip) chips may be attached to the substrate by adhesive, such as an epoxy adhesive, for example. Both conductive (for enabling electrical contact) and non-conductive (for mere fixing) adhesives may be utilized. Such elements are preferably selected so as to withstand the pressure and temperature of the utilized lightguide-establishing process such as lamination or injection over-moulding process. Alternatively or additionally, the lightguide may established by applying a sheet or film of suitable material, e.g. glass or plastic material, which is disposed onto the substrate and, for example, glued and/or otherwise fixed thereto. The materials, such as the lightguide material(s), utilized in accordance with the embodiments of the present invention may include epoxy and/or sol-gel or corresponding, potentially moulded, materials.

In 312 the optoelectronic elements including the light emitter(s) and detector(s) are bonded with the substrate by adhesive, for example. Accordingly, suitable printing technologies may be exploited. E.g. OLEDs may be printed on the substrate by an inkjet printer or other applicable device. The light emitters and detectors are configured to emit and detect, respectively, predetermined wavelengths of electromagnetic radiation, e.g. visible wavelengths and/or, in many use cases preferred, non-visible wavelengths such as infrared wavelengths.

A person skilled in the art will appreciate the fact that provision of optoelectronic and other electrical elements on the substrate may in various other embodiments of the present invention split also differently, if at all, between the illustrated and merely exemplary stages 310 and 312, and the related number of production stages may be adapted accordingly. For example, most of the components, including both the support components and the optoelectronic components, may be added to the already formed circuit model of mere conductors substantially during the same production stage or in multiple subsequent stages.

The use of advantageously flexible materials preferably enables carrying out at least some of the items 322, 310, 312, or further items, by roll-to-roll methods, which may provide additional benefits time-, cost- and even space-wise considering e.g. transportation and storage. In roll-to-roll, or 'reel-to-reel', methods the desired elements, such as optical and/or electrical ones, may be deposited on a continuous 'roll' substrate, which may be both long and wide, advancing either in constant or dynamic speed from a source roll, or a plurality of source rolls, to a destination roll during the procedure. Thus the substrate may thus comprise multiple products that are to be cut separate later. The roll-to-roll manufacturing advantageously enables rapid and cost effective manufacturing of products also in accordance with the present invention. During the roll-to-roll process several material layers may be joined together 'on the fly', and the aforesaid elements such as electronics may be structured on them prior to, upon, or after the actual joining instant. The source layers and the resulting band-like aggregate entity may be further subjected to various treatments during the process. Layer thicknesses (thinner layers such as 'films' are generally preferred in facilitating roll-to-roll processing) and optionally also other properties should be selected so as to enable roll-to-roll processing to a preferred extent.

In 314 the lightguide is formed on the substrate such that at least portion of the electronics is "immersed" therein, e.g. in the recesses of the lightguide. Thereby, the lightguide may act as a cover for the electronics and as a light-transporting (TIR) medium between the emitter(s) and the detector(s).

In one embodiment the lightguide comprises plastic material such as PC that is laminated, (over-)moulded or otherwise disposed onto the substrate like a thermoplastic polymer film, e.g. a PET film, having electronics already provided thereon. During moulding, the substrate may be applied as an insert into the mold of the injection moulding apparatus so that the PET is cast upon the substrate. The provided lightguide material and the used attachment method shall be preferably selected such that the electronics on the substrate remain unharmed during the process, while the lightguide material is properly attached to the substrate and the optical properties thereof are as desired.

In 316 and 320 it is optionally checked whether further processing of the lightguide-substrate aggregate is required, and if this is the case, the necessary steps are taken, respectively. For example, supplementary material layers may be added to the touchscreen arrangement. In one embodiment, at least part of the arrangement, such as (a portion of) the lightguide, may be provided with a hard-coating that protects against scratches. Additionally or alternatively, other functional or decorative layers or treatments may be provided, such as a layer for enhancing the feel of the touch surface from the standpoint of the user. Further, step 318 may refer to coupling additional and/or external elements such as connectors or (flex) cables to the arrangement, and even to placing the arrangement in the target product such as a mobile terminal or a control display. Yet, different quality checks and tests concerning the functioning of the laminated or over-moulded (or otherwise established/processed) elements, the lightguide and/or remaining entities may be performed.

It is to be understood that phase 316 may not necessarily refer to a real-time check e.g. on the basis of a real-time monitored property of the arrangement such as the functioning of the electronics or lightguide, as the 'check' may also refer to a predetermined process control parameter value (e.g. add hard-coating=TRUE) coded in the process control data, which is then used to define the treatment whereto the arrangement is subjected.

In phase 318 the method execution ends and the obtained touchscreen arrangement(s) may be transported forward.

Figure 4:
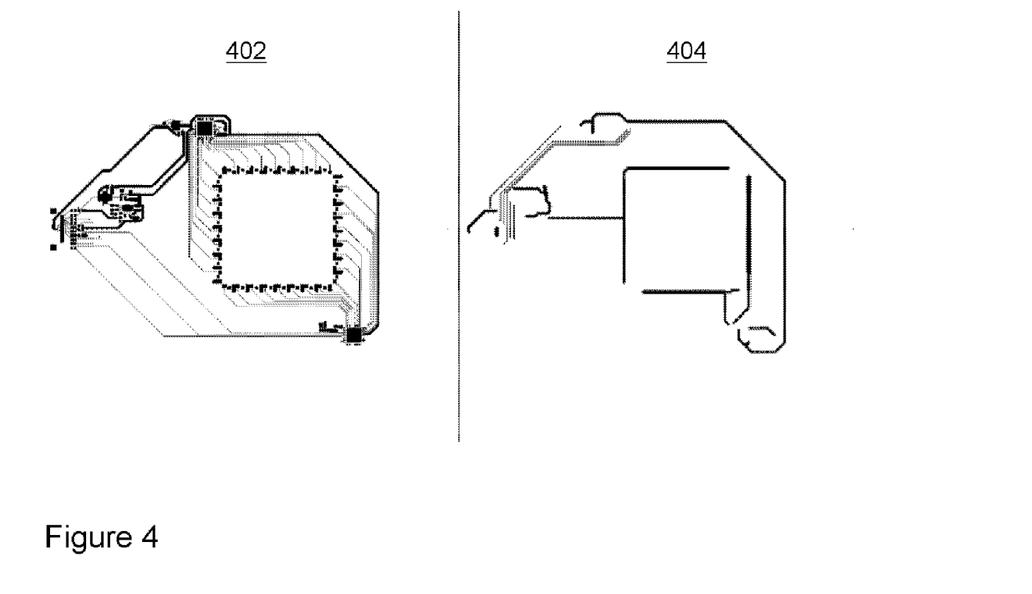
FIG. 4 illustrates top and bottom views of one embodiment of the touchscreen arrangement in accordance with the present invention.

FIG. 4 illustrates top and bottom views of one embodiment of the touchscreen arrangement's layout outline in accordance with the present invention. In item 402 a 'top' view is shown and in item 404 a bottom view is shown. The conductors, connectors, chips, and other components are recognizable in the figure, wherein the emitter/detector arrays surround a rectangular, substantially a square, touch screen window to be used as a touch area overlay for a display, for example.

Figure 5A:
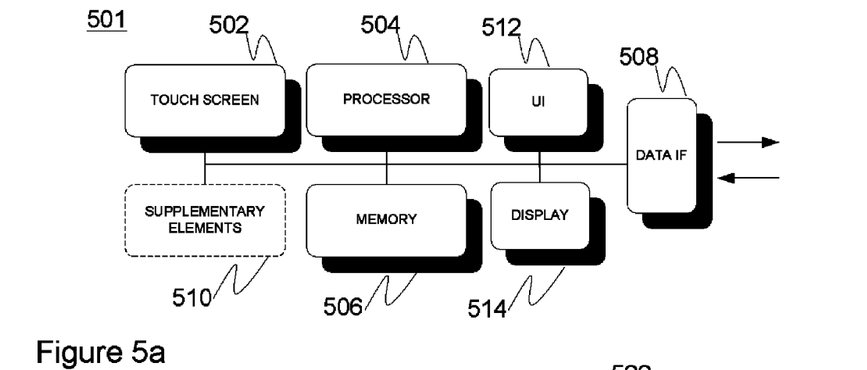
FIG. 5a is a block diagram of one embodiment of an apparatus comprising the touchscreen arrangement in accordance with the present invention.

FIG. 5a is a general block diagram of one embodiment of an apparatus 501 comprising a touchscreen (and/or a touchpad) arrangement in accordance with the present invention. The apparatus may include or be a mobile terminal, a PDA, a control device for industrial applications, a multi-purpose computer (desktop/laptop/palmtop), etc. As being clear to a skilled person, various elements of the apparatus 501 may be directly integrated in the same housing or provided at least with functional connectivity, e.g. wired or wireless connectivity, with each other. For instance, a display 514 and the associated touchscreen 502 may be incorporated in the apparatus 501 as integrated or separate elements.

One potential, if not elementary, functional element that is included in the apparatus is memory 506, which may be divided between one or more physical memory chips and/or cards, may comprise necessary code, e.g. in a form of a computer program/application, for enabling the control and operation of the apparatus, and further comprise other data, e.g. current settings and user data. The memory 506 may include e.g. ROM (read only memory) or RAM -type (random access memory) implementations. The memory 506 may further refer to an advantageously detachable memory card/stick, a floppy disc, an optical disc, such as a CD-ROM, or a fixed/removable hard drive.

A processing means 504, e.g. a processing/controlling unit such as a microprocessor, a DSP (digital signal processor), a micro-controller or programmable logic chip(s), optionally comprising a plurality of co-operating or parallel (sub-)units, may be needed for the actual execution of the application code that may be stored in memory 506. Display 514 and keyboard/keypad 512 or other supplementary control input means, such as keys, buttons, knobs, voice control interface, sliders, rocker switches, etc, may provide the user of the apparatus 501 with data visualization means and control input means in addition to the touchscreen 502 (~user interface, UI) in connection with the display 514. The processor 504 may control the touchscreen arrangement, or a specific control means may be alternatively or additionally provided for the purpose. Data interface 508, e.g. a wireless transceiver (GSM (Global System for Mobile Communications), UMTS (Universal Mobile Telecommunications System), WLAN (Wireless Local Area Network), Bluetooth, infrared, etc), and/or an interface for a fixed/wired connection, such as an USB (Universal Serial Bus) port, a LAN (e.g. Ethernet) interface, or Firewire-compliant (e.g. IEEE 1394) interface, is typically required for communication with other devices. The apparatus may include various supplementary elements 510 that can be used with the touchscreen arrangement 502, for instance. It is self-evident that further functionalities may be added to the apparatus and the aforesaid functionalities may be modified depending on each particular embodiment.

Figure 5B:
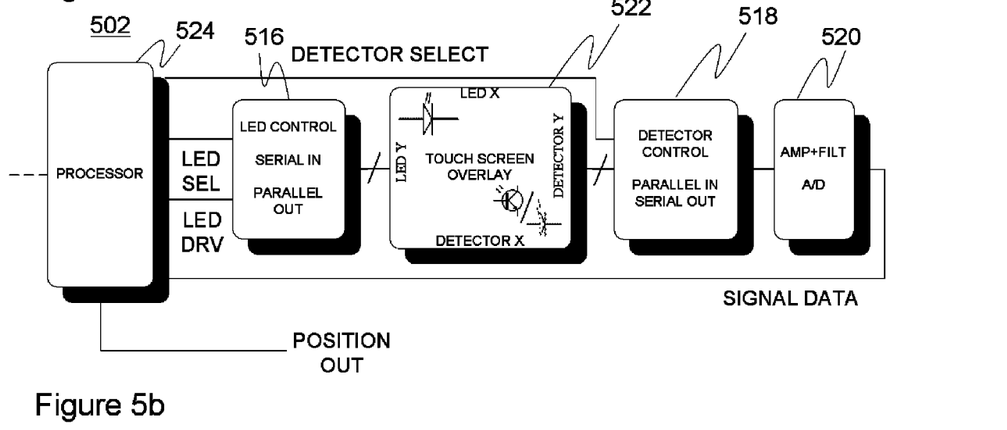
FIG. 5b is a block diagram of one embodiment of the touchscreen arrangement according to the present invention.

FIG. 5b is a block diagram of one embodiment of the touchscreen arrangement 502 according to the present invention. The touchscreen arrangement may in practice include own, external, and/or shared control or other means, such as processor 524, in view of the rest of the apparatus 501 or a similar host system. For example, the processor 504 could control also the touchscreen 502, i.e. processor 504=524, if provided with necessary connection to the support electronics of the lightguide/substrate arrangement.

The arrangement 502 may comprise a controller switch, e.g. a 'demultiplexer', 516 that drives the emitters of the actual touch screen overlay 522, i.e. the functional part comprising a predetermined touch surface (area) and the emitter/detector arrays or other patterns, and is controlled by processor 524, which may additionally or alternatively refer to a shared unit 504 controlling also other functions of the apparatus 501 as deliberated above. The provided control is illustrated as LED SELector and LED DRiVer signals. Also the detectors may be controlled by the processor 524 or some other processing means e.g. via a multiplexer switch 518. The provided control is illustrated as DETECTOR SELECT signal. The obtained detector signal(s) such as the illustrated SIGNAL DATA signal may be preprocessed such as amplified, filtered, and/or A/D-converted 520 prior to forwarding to the processor 524 or some other processing means like processor 504. The illustrated functional elements may comprise further connections, e.g. via connectors or conductors possibly including data cables, to elements that are external to the touch screen arrangement or implemented on the same substrate. One such connection has been illustrated as POSITION OUT in the figure.

A person skilled in the art will appreciate that the functionalities of the visualized blocks in FIGS. 5a and 5b may be in practical circumstances split differently between the shown and/or other entities depending on the embodiment.

Figure 6:
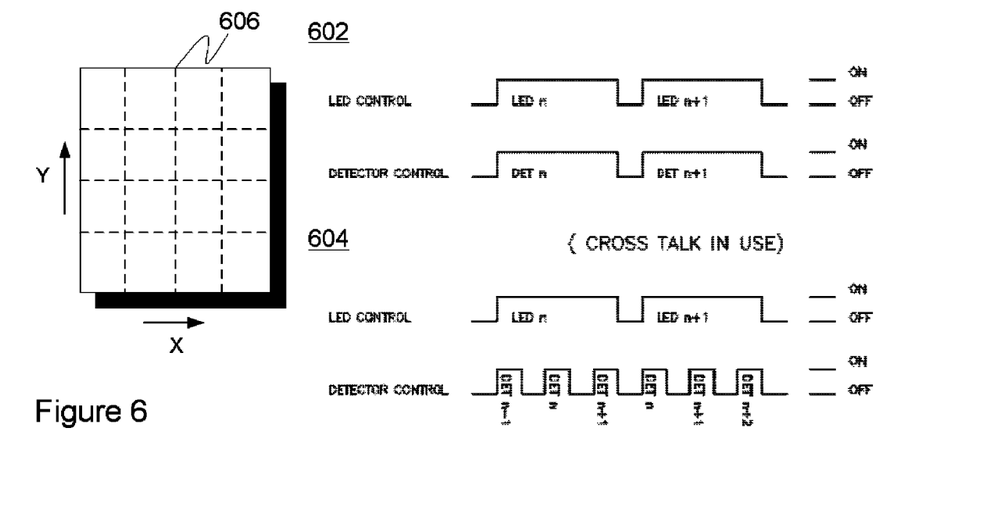
FIG. 6 shows timing diagrams for two embodiments of sequentially driving the emitters and detectors of the touchscreen arrangement in accordance with the present invention.

FIG. 6 depicts few merely exemplary timing diagrams of two embodiments for sequentially driving the emitters and detectors of the touchscreen arrangement. In the example marked with a reference numeral 602 a LED, or other type of an emitter, and a corresponding detector, such as a phototransistor or photodiode, are active substantially simultaneously as visualized by the control signals' up and down portions. The emitter/detector pairs are sequentially activated in a continuous manner such that only one pair is active at a time. This is done for detecting and locating the touches.

As a concretized example, a channel may be defined as an emitter-detector—pair in X- or Y-direction, wherein X and Y define two orthogonal axes, each of which being parallel with two borderlines of a rectangular touch surface area (~window) 606 surrounded by the emitters and detectors. Signal on a certain, location-dependent channel is then based on the intensity level of light emitted by a certain emitter and detected at a corresponding detector. In the illustrated there are three emitters and detectors disposed parallel to the X and Y axes on the opposite sides of the touch surface area 606, which is illustrated via the vertical and horizontal broken lines denoting 'channels' across the lightguide surface, respectively.

By keeping all the emitters and detectors constantly on and given a touch on an area associated with the certain channel, which links to a certain touch surface 'strip' extending between the certain emitter and the corresponding detector on the lightguide's overall touch area, the detector still captures exceedingly lot of light from other active emitters, which naturally reduces the touch recognition and localization capability and sensitivity of the arrangement. Thus, the emitters shall be preferably pulsed on a channel-by-channel basis:

Turn on the LED X1 for a time tp, and read the signal at sensor X1 simultaneously apply latency for a time period t1, if needed Turn on the LED X2 for a time tp, and read the signal at sensor X2 simultaneously apply latency for a time period t1 if needed

. . .

Turn on the LED Y1 for a time tp, and read the signal at sensor Y1 simultaneously

. . .

If decisive signal attenuation is detected relative to a channel crossing (Xt, Yt), the touch location on the lightguide can be programmatically mapped to a corresponding point on the related display. Also, multiple crossings can be mapped to discrete multiple simultaneous touches or a touch by a large finger or stylus.

Typical rise/fall times of optoelectronic components may be of the order of few microseconds. Thus, the pulse times less than about 0.5 ms are easily attained in terms of hardware. In a tested example set-up (12 channels), the overall time for one whole sequence could be pushed to less than about 0.01 s. This is fast enough for most applications.

In the example marked with a reference numeral 604, 'cross-talk' sequencing is used wherein one LED is associated with a plurality of in this example three, detectors, i.e. the one that is actually opposing the LED, i.e. the 'main' detector, and the two adjacent ones. During the sequencing and active portion of a certain emitter, the detection signals of the associated three detectors may be then sequentially read as shown prior to moving into a next group of an emitter and three detectors. Some detectors may be associated with a plurality of emitters, i.e. the groups overlap relative to the detectors. By this procedure, the obtained resolution can be doubled in both directions (X/Y) at least on areas near the screen center because both temporal and positional distribution of light as captured by detectors (~local temporal intensity level at each detector of the group) is available for analysis. Further group configurations (e.g. multiple emitters—multiple detectors per group) are also possible.

In addition to touch recognition and localization aspects, touch intensity or pressure, i.e. how hard the finger or stylus is pressed upon the lightguide, may be monitored for additional control of the target device. The pressure may be deduced from the amount and optionally nature of the FTIR-based light intensity loss (i.e. more FTIR-induced loss indicates more touch pressure) at a detector, for example.

Considering the present invention in light of the related process parameters and set-up, few further guidelines can be given on the basis of conducted tests. When the substrate is PET and the lightguide plastics to be, for example, overmoulded thereon is PC, the temperature of the melted PC may be about 280 to 320° C. and mould temperature about 20 to 95° C., e.g. about 80° C. The used substrate (film) and the process parameters shall be selected such that the substrate does not melt and remains substantially solid during the process. The substrate shall be positioned in the mould such that it remains properly fixed. Likewise, the preinstalled electronics shall be attached to the substrate such that they remain static during the molding.

In some embodiments, the zero-order path (direct path without reflections) between a light emitter and a corresponding light detector may be blocked, in addition to or instead of using certain emitter/detector alignment for the same purpose, by a specific blocking structure, such as a mask, in order to increase the relative proportion of the TIR-propagated light at the detector, which may further facilitate detecting the FTIR-based loss, whenever the TIR-phenomenon on the lightguide surface (or associated coating surface) is disturbed by the touch of a finger(tip) or other stylus.

Correspondingly, the detector(s) may be protected from external unwanted light (e.g. sunlight or display lighting) by a blocking structure.

The scope of the invention is determined by the attached claims together with the equivalents thereof. The skilled persons will again appreciate the fact that the explicitly disclosed embodiments were constructed for illustrative purposes only, and the scope will cover further embodiments, embodiment combinations, variations and equivalents that better suit each particular use case of the invention. For example, in one solution merely the support electronics, or a part thereof, and/or part of the emitters/detectors are covered by the lightguide material. In that case the remaining (parts of the) emitters/detectors could be located elsewhere, preferably still on the substrate, so that they are at least optically coupled to the over-moulded lightguide. The coupling could occur directly between the emitters/detectors and the lightguide (e.g. with a small gap or direct contact between the emitters/detectors and the light-guide), or via dedicated incoupling and/or outcoupling structures such as gratings.

The invention claimed is:

1. An arrangement for a user input device, such as a touchscreen or a touchpad, the arrangement comprising:
   a substrate, such as an optically substantially transparent flex film or a multilayer film, said substrate comprising support electronics, such as printed, optionally roll-to-roll processed, electronics including a number of printed conductors, for providing power, control and/or communications connection to further electronic components,
   a number of emitters and detectors arranged to said substrate into contact with the support electronics, for emitting and detecting light, respectively, and
   a lightguide laminated onto the substrate such that said emitters and detectors are optically coupled to the lightguide material, the properties of the lightguide including the refractive index of the lightguide material being selected and the emitters and detectors being configured so as to enable, when in use, total internal reflection (TIR)
   type propagation of light within the lightguide between the emitters and detectors, and recognition of a touch on the basis of a drop in the TIR performance as determined from the detected light, said drop including a FTIR (frustrated TIR)-induced drop in the light intensity level, as captured by one or more detectors, in contrast to a predetermined or adaptively determined basic reception level during a TIR condition,
   and further wherein the lightguide surface that faces the substrate has been provided, prior to being laminated onto the substrate, with a recess or hole accommodating at least portion of at least one emitter or detector positioned therein.

2. The arrangement of claim 1, wherein the substrate is a multilayer substrate comprising the support electronics, emitters and detectors as spread between at least two layers thereof.

3. The arrangement of claim 1, wherein at least a predetermined touch surface of the lightguide has been provided with an additional protective material layer or a layer configured to improve the touch feel.

4. The arrangement of claim 1, wherein the configuration enables recognizing the touch, optionally locating the touch and further optionally determining the touch pressure, from FTIR (frustrated TIR)-induced distribution as captured by one or more detectors in contrast to a predetermined or adaptively determined basic distribution during a TIR condition.

5. The arrangement of claim 1, wherein the emitters include at least one LED (light emitting diode) or OLED (organic LED).

6. The arrangement of claim 1, wherein the detectors include at least one element selected from the group consisting of: a photodiode, a phototransistor, and an image sensor.

7. The arrangement of claim 1, comprising a plurality of emitters and detectors configured to sequentially activate and deactivate in groups such that in one group at least one emitter is associated with a plurality of detectors to increase the resolution in locating the touch relative to the surface of the lightguide.

8. An electronic apparatus comprising the arrangement of claim 1 and optionally comprising a display and/or a touchpad associated with the arrangement, wherein said apparatus further optionally comprises one element selected from the group consisting of: a mobile terminal, a personal digital assistant, a music player, a multimedia player, a portable computer, a desktop computer, a palmtop computer, a portable radio, and a control device for an industrial application.

9. A method for manufacturing an arrangement for a user input device, such as a touchscreen or a touchpad, said method comprising:
- providing a substrate, such as an optically substantially transparent film,
- arranging support electronics, such as printed electronics including a number of printed conductors, on the substrate for providing power, control and/or communications connection to further electronic components,
- arranging a number of emitters and detectors on said substrate into contact with the support electronics, for emitting and detecting light, respectively, and
- laminating a lightguide onto the substrate such that said emitters and detectors are optically coupled to the lightguide material and the lightguide surface facing the substrate is provided, prior to said laminating, with a recess or hole accommodating at least portion of at least one emitter or detector, the properties of the lightguide including the refractive index of the lightguide material being selected and the emitters and detectors being configured so as to enable, when in use, total internal reflection (TIR)-type propagation of light within the lightguide between the emitters and detectors and recognition of a touch on the basis of a drop in the TIR performance as determined from the detected light, said drop including a FTIR (frustrated TIR)-induced drop in the light intensity level, as captured by one or more detectors, in contrast to a predetermined or adaptively determined basic reception level during a TIR condition.

* * * * *